(12) United States Patent
Zhou et al.

(10) Patent No.: US 11,481,973 B2
(45) Date of Patent: Oct. 25, 2022

(54) METHOD, DEVICE, AND STORAGE MEDIUM FOR SEGMENTING THREE-DIMENSIONAL OBJECT

(71) Applicant: TENCENT TECHNOLOGY (SHENZHEN) COMPANY LIMITED, Shenzhen (CN)

(72) Inventors: Cheng Zhou, Shenzhen (CN); Tianzhou Wang, Shenzhen (CN)

(73) Assignee: TENCENT TECHNOLOGY (SHENZHEN) COMPANY LIMITED, Shenzhen (CN)

(*) Notice: Subject to any disclaimer, the term of this patent is extended or adjusted under 35 U.S.C. 154(b) by 0 days.

(21) Appl. No.: 17/079,707

(22) Filed: Oct. 26, 2020

(65) Prior Publication Data

US 2021/0042999 A1 Feb. 11, 2021

Related U.S. Application Data

(63) Continuation of application No. PCT/CN2019/115095, filed on Nov. 1, 2019.

(30) Foreign Application Priority Data

Nov. 6, 2018 (CN) .......................... 201811315438.3

(51) Int. Cl.
*G06T 17/20* (2006.01)
*G06T 7/10* (2017.01)
*G06T 3/40* (2006.01)

(52) U.S. Cl.
CPC ............... *G06T 17/20* (2013.01); *G06T 3/40* (2013.01); *G06T 7/10* (2017.01); *G06T 2200/04* (2013.01)

(58) Field of Classification Search
None
See application file for complete search history.

(56) References Cited

U.S. PATENT DOCUMENTS 8,233,716 B2 7/2012 Kletter
2005/0246130 A1* 11/2005 Spicer .................... G06T 17/30
702/152

(Continued)

FOREIGN PATENT DOCUMENTS

CN 104103035 A 10/2014
CN 103942824 B 1/2017

(Continued)

OTHER PUBLICATIONS

Iteanu, Fabian, and Reinhard Klein. "Hybrid tree reconstruction from inhomogeneous point clouds." The Visual Computer 30.6 (2014): 763-771 (Year: 2014).*

(Continued)

*Primary Examiner* — Sarah Le
(74) *Attorney, Agent, or Firm* — Crowell & Moring LLP

(57) ABSTRACT

The present disclosure describes a three-dimensional object segmentation method and device, and medium, and relates to the field of computer vision (CV) technologies of an artificial intelligence (AI) technology. The method includes obtaining, by a device, a point cloud of a three-dimensional object. The device includes a memory storing instructions and a processor in communication with the memory. The method includes determining, by the device, three scaling directions of the point cloud; scaling, by the device, positions of points in the point cloud along the three scaling directions to obtain a scaled point cloud, so that the scaled point cloud has the same scale in the three scaling directions;

(Continued)

and segmenting, by the device, the three-dimensional object based on the scaled point cloud to obtain a segmentation result.

14 Claims, 11 Drawing Sheets

(56) References Cited

U.S. PATENT DOCUMENTS

| | | | |
|---|---|---|---|
| 2013/0127848 A1* | 5/2013 | Joshi | G06T 17/20 |
| | | | 345/420 |
| 2016/0063721 A1 | 3/2016 | Nakano | |
| 2017/0154471 A1* | 6/2017 | Woo | G06T 19/006 |
| 2019/0087979 A1* | 3/2019 | Mammou | G06T 9/001 |
| 2019/0139266 A1* | 5/2019 | Budagavi | G06T 17/00 |

FOREIGN PATENT DOCUMENTS

| | | |
|---|---|---|
| CN | 108537868 A | 9/2018 |
| CN | 110163863 A | 8/2019 |

OTHER PUBLICATIONS

International Search Report with English translation and Written Opinion Yegarding PCT/CN2019/115095 dated Feb. 20, 2020, 9 pages.

Extended European Search Report regarding EP198822110 dated Nov. 24, 2021.

Ruiz et al., "Fitting of Analytic Surfaces to Noisy Point Clouds," American Journal of Computational Mathematics, vol. 03, No. 01, 2013, pp. 18-26.

Ariel Shamir, "A survey on Mesh Segmentation Techniques," Computer Graphics Forum, vol. 27, No. 6, Jan. 4, 2008, pp. 1539-1556.

* cited by examiner 510 520

METHOD, DEVICE, AND STORAGE MEDIUM FOR SEGMENTING THREE-DIMENSIONAL OBJECT

RELATED APPLICATION

This application is a continuation application of PCT Patent Application No. PCT/CN2019/115095, filed on Nov. 1, 2019, which claims priority to Chinese Patent Application No. 201811315438.3, filed on Nov. 6, 2018, both of which are incorporated herein by reference in their entireties.

FIELD OF THE TECHNOLOGY

Embodiments of this application relate to the field of computer vision (CV) technologies of an artificial intelligence (AI) technology, and more specifically, to a three-dimensional object segmentation method and device, and a medium.

BACKGROUND OF THE DISCLOSURE

Simulation-based physical simulation technology is an important branch of computer vision (CV) technologies, and is widely applied to films and televisions, animations, games, robot control, and the like. To efficiently and accurately simulate a collision in a real physical environment, or to enable a user to interact in real time, in game and film and television production, developers often use convex shapes, such as cylinders, ellipsoids, or convex polyhedrons, to approximate objects in a virtual world. However, in practice, there are a large quantity of concave objects. If a simple convex set is used for approximation, not only a large approximation error is caused, but also a false collision occurs.

To resolve this problem, convex segmentation needs to be performed on a three-dimensional object in the real physical environment. That is, the three-dimensional object is segmented into several sub-objects, and each sub-object is ensured to be a convex set.

Currently, a precise convex set segmentation algorithm exists. However, a computation amount of the algorithm increases exponentially. The algorithm not only is infeasible in calculation, but also segments excessive sub-objects, and is unfavorable for use in a simulation environment. To overcome these disadvantages, in the related art, an approximate convex set segmentation algorithm is further provided, and implements the equalization of a segmentation speed, a quantity and a simulation collision effect while allowing a local tiny depression.

An indoor environment is a classic physical simulation object. A shape of a three-dimensional object in the indoor environment is more complex, and collisions occur more frequently. This has a higher requirement on three-dimensional object segmentation. A large quantity of thin-walled objects such as wall surfaces, table tops, and various plates exist in the indoor environment, and many of the thin-walled objects further have hollowed-out structures, such as wall surfaces of doors and windows, drawers and cabinets. The existence of such objects further increases the difficulty of three-dimensional object segmentation.

The approximate convex set segmentation algorithm described above often has a poor segmentation effect on the thin-walled objects with the hollowed-out structures. Intuitively, this is because it is difficult for the traditional approximate convex set segmentation algorithm to effectively distinguish between the hollowed-out structures and small structural depressions of the thin-walled objects. Specifically, when segmenting the three-dimensional object, related approximate convex set algorithms are consistent in processing in all directions without considering special structures of the thin-walled objects, but the concavity of many thin-walled objects is extremely sensitive to the directions.

The present disclosure describes various embodiments for segmenting a three-dimension object, addressing at least some the problems/issues discussed above.

SUMMARY

In view of the above situation, it is expected to provide a three-dimensional object segmentation method and device that can improve a segmentation effect for hollowed-out thin-walled objects.

The present disclosure describes a method for segmenting a three-dimensional object. The method includes obtaining, by a device, a point cloud of a three-dimensional object. The device includes a memory storing instructions and a processor in communication with the memory. The method includes determining, by the device, three scaling directions of the point cloud; scaling, by the device, positions of points in the point cloud along the three scaling directions to obtain a scaled point cloud, so that the scaled point cloud has the same scale in the three scaling directions; and segmenting, by the device, the three-dimensional object based on the scaled point cloud to obtain a segmentation result.

The present disclosure describes a device for segmenting a three-dimensional object. The device includes a memory storing instructions; and a processor in communication with the memory. When the processor executes the instructions, the processor is configured to cause the device to: obtain a point cloud of a three-dimensional object, determine three scaling directions of the point cloud, scale positions of points in the point cloud along the three scaling directions to obtain a scaled point cloud, so that the scaled point cloud has the same scale in the three scaling directions, and segment the three-dimensional object based on the scaled point cloud to obtain a segmentation result.

The present disclosure describes a non-transitory computer readable storage medium storing computer readable instructions. The computer readable instructions, when executed by a processor, are configured to cause the processor to perform: obtaining a point cloud of a three-dimensional object; determining three scaling directions of the point cloud; scaling positions of points in the point cloud along the three scaling directions to obtain a scaled point cloud, so that the scaled point cloud has the same scale in the three scaling directions; and segmenting the three-dimensional object based on the scaled point cloud to obtain a segmentation result.

According to an aspect of embodiments of this application, a three-dimensional object segmentation method is provided, applied to a three-dimensional object segmentation device, the method including: obtaining a point cloud of a three-dimensional object; determining three scaling directions of the point cloud; separately scaling positions of points in the point cloud along the three scaling directions, so that the scaled point cloud has the same scale in the three scaling directions; and determining a segmentation result of the three-dimensional object based on the scaled point cloud.

In addition, in the three-dimensional object segmentation method according to the embodiments of this application, the operation of determining three scaling directions of the point cloud includes: performing three-dimensional space ellipse fitting on the point cloud; using three axes of a fitted ellipsoid as coordinate axes to establish a first coordinate system; determining a minimum circumscribed parallelepiped of the point cloud based on a projection of the point cloud in the first coordinate system; and using directions respectively perpendicular to three adjacent planes of the minimum circumscribed parallelepiped as the three scaling directions.

In addition, in the three-dimensional object segmentation method according to the embodiments of this application, the operation of determining a minimum circumscribed parallelepiped of the point cloud based on a projection of the point cloud in the first coordinate system includes: obtaining a minimum circumscribed cuboid of the point cloud by performing rotation scale clamping on projections of the point cloud in coordinate axis planes; and obtaining the minimum circumscribed parallelepiped by adjusting edges of the minimum circumscribed cuboid, a volume of the minimum circumscribed parallelepiped being less than a volume of the minimum circumscribed cuboid.

In addition, in the three-dimensional object segmentation method according to the embodiments of this application, the operation of separately scaling positions of the point cloud along the three scaling directions includes: using the three scaling directions as coordinate axes as to establish a second coordinate system; transforming coordinates of the points in the point cloud into coordinates in the second coordinate system; separately determining a maximum value and a minimum value of the points in the point cloud in coordinate axes in the second coordinate system; and normalizing coordinate values of the points in the point cloud based on the maximum value and the minimum value.

In addition, in the three-dimensional object segmentation method according to the embodiments of this application, the operation of determining a segmentation result of the three-dimensional object based on the scaled point cloud includes: determining, based on the scaled point cloud, a plurality of model patches for reconstructing an outer surface of the three-dimensional object; clustering the plurality of model patches into a plurality of patch groups based on a similarity relationship between the model patches; and determining a maximum set of patch groups that are adjacent and are convex sets, and using the maximum set of patch groups as a segmentation part of the three-dimensional object.

In addition, in the three-dimensional object segmentation method according to the embodiments of this application, the operation of determining, based on the scaled point cloud, a plurality of model patches for reconstructing an outer surface of the three-dimensional object includes: cutting the point cloud by using a plurality of first cubes of equal size; replacing all points in the point cloud with endpoints of the first cubes, and obtaining an updated point cloud; cutting the updated point cloud by using a plurality of second cubes of equal size, a volume of the second cube being greater than a volume of the first cube; and determining corresponding model patches based on a point intersection situation of the second cubes and the updated point cloud.

In addition, in the three-dimensional object segmentation method according to the embodiments of this application, after the operation of determining a plurality of model patches for reconstructing an outer surface of the three-dimensional object, the method further includes: adding adjustment points on each model patch; and generating a new model patch based on the added adjustment points.

According to another aspect of this application, a three-dimensional object segmentation device is provided, including: an obtaining unit, configured to obtain a point cloud of a three-dimensional object; a scaling direction determining unit, configured to determine three scaling directions of the point cloud; a scaling unit, configured to separately scale positions of points in the point cloud along the three scaling directions, so that the scaled point cloud has the same scale in the three scaling directions; and a segmentation unit, configured to determine a segmentation result of the three-dimensional object based on the scaled point cloud.

In addition, in the three-dimensional object segmentation device according to the embodiments of this application, the scaling direction determining unit includes: a fitting component, configured to perform three-dimensional space ellipse fitting on the point cloud, and use three axes of a fitted ellipsoid as coordinate axes to establish a first coordinate system; a minimum circumscribed parallelepiped search component, configured to determine a minimum circumscribed parallelepiped of the point cloud based on a projection of the point cloud in the first coordinate system; and a scaling direction determining component, configured to use directions respectively perpendicular to three adjacent planes of the minimum circumscribed parallelepiped as the three scaling directions.

In addition, in the three-dimensional object segmentation device according to the embodiments of this application, the minimum circumscribed parallelepiped search component is configured to: obtain a minimum circumscribed cuboid of the point cloud by performing rotation scale clamping on projections of the point cloud in coordinate axis planes; and obtain the minimum circumscribed parallelepiped by adjusting edges of the minimum circumscribed cuboid, a volume of the minimum circumscribed parallelepiped being less than a volume of the minimum circumscribed cuboid.

In addition, in the three-dimensional object segmentation device according to the embodiments of this application, the scaling unit is configured to: use the three scaling directions as coordinate axes as to establish a second coordinate system; transform coordinates of the points in the point cloud into coordinates in the second coordinate system; separately determine a maximum value and a minimum value of the points in the point cloud in coordinate axes in the second coordinate system; and normalize coordinate values of the points in the point cloud based on the maximum value and the minimum value.

In addition, in the three-dimensional object segmentation device according to the embodiments of this application, the segmentation unit includes: a patch reconstruction component, configured to determine, based on the scaled point cloud, a plurality of model patches for reconstructing an outer surface of the three-dimensional object; a clustering component, configured to cluster the plurality of model patches into a plurality of patch groups based on a similarity relationship between the model patches; and a segmentation component, configured to: determine a maximum set of patch groups that are adjacent and are convex sets, and use the maximum set of patch groups as a segmentation part of the three-dimensional object.

In addition, in the three-dimensional object segmentation device according to the embodiments of this application, the patch reconstruction component is configured to: cut the point cloud by using a plurality of first cubes of equal size; replace all points in the point cloud with endpoints of the first cubes, and obtain an updated point cloud; cut the updated point cloud by using a plurality of second cubes of equal size, a volume of the second cube being greater than a volume of the first cube; and determine corresponding model patches based on a point intersection situation of the second cubes and the updated point cloud.

In addition, in the three-dimensional object segmentation device according to the embodiments of this application, the segmentation unit includes: an adjustment component, configured to: add adjustment points on each model patch; and generate a new model patch based on the added adjustment points.

According to still another aspect of this application, a three-dimensional object segmentation device is provided, including: a storage unit, storing a computer program; and a processing unit, configured to implement, when executing the computer program, the following operations: obtaining a point cloud of a three-dimensional object; determining three scaling directions of the point cloud; separately scaling positions of points in the point cloud along the three scaling directions, so that the scaled point cloud has the same scale in the three scaling directions; and determining a segmentation result of the three-dimensional object based on the scaled point cloud.

According to yet another aspect of this application, a computer-readable recording medium is provided, storing a computer program, the computer program, when executed by a processing unit, implementing the following operations: obtaining a point cloud of a three-dimensional object; determining three scaling directions of the point cloud; separately scaling positions of points in the point cloud along the three scaling directions, so that the scaled point cloud has the same scale in the three scaling directions; and determining a segmentation result of the three-dimensional object based on the scaled point cloud.

In the three-dimensional object segmentation method and device, and the medium according to the embodiments of this application, the point cloud representing the three-dimensional object is scaled to the same scale in all directions, and therefore, during subsequent segmentation processing, for example, hollowed-out structures of thin-walled objects are no longer recognized as approximatable depressions, so that compared with the traditional three-dimensional object segmentation algorithm, the segmentation accuracy is further improved.

DESCRIPTION OF EMBODIMENTS

Figure 1:
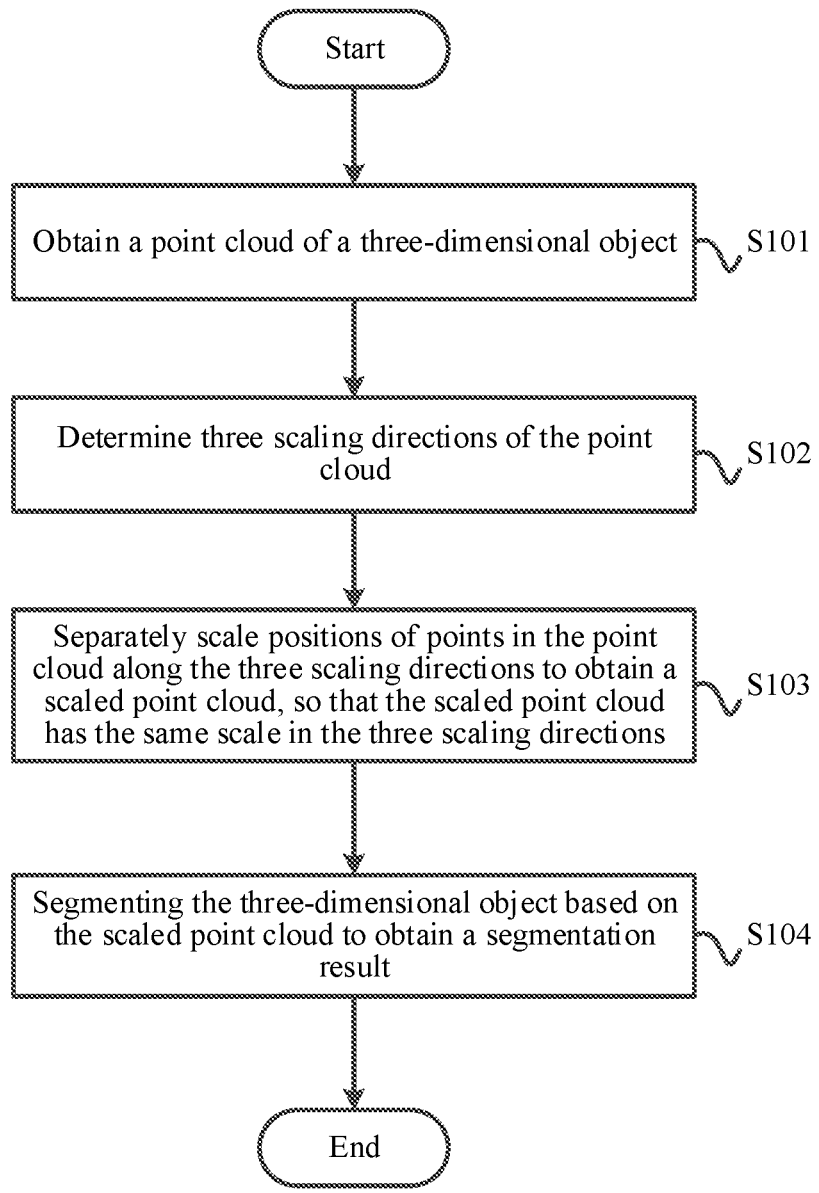
FIG. 1 is a flowchart of a three-dimensional object segmentation method according to an embodiment of this application.

The preferable implementations of this application are described below with reference to the accompanying drawings. The following description, with reference to the accompanying drawings, is provided to help understanding of exemplary implementations of this application defined by the claims and equivalents thereof. The description includes specific details for helping understanding, but the specific details are only seen to be exemplary. Therefore, a person skilled in the art knows that, various changes and modifications may be made to the implementations described herein without departing from the scope and spirit of this application. In addition, to make this specification clearer and more concise, detailed descriptions of functions and constructions well known in the art are omitted.

Artificial Intelligence (AI) is a theory, method, technology, and application system that use a digital computer or a machine controlled by a digital computer to simulate, extend, and expand human intelligence, perceive the environment, obtain knowledge, and use the knowledge to obtain the best result. In other words, AI is a comprehensive technology of computer science, which attempts to understand essence of intelligence and produces a new intelligent machine that responds in a manner similar to human intelligence. AI is to study design principles and implementation methods of various intelligent machines, so that the machines have the functions of perception, reasoning, and decision-making.

The AI technology is a comprehensive discipline, covering a wide range of fields including both a hardware-level technology and a software-level technology. The basic AI technology generally includes a technology such as a sensor, a dedicated AI chip, cloud computing, distributed storage, a big data processing technology, an operation/interaction system, or mechatronics. An AI software technology mainly includes fields such as a computer vision (CV) technology, a speech processing technology, a natural language processing technology, and machine learning/deep learning.

The CV is a science that studies how to use a machine to "see", and furthermore, is machine vision that a camera and a computer are used for replacing human eyes to perform recognition, tracking, measurement, and the like on a target, and further perform graphic processing, so that the computer processes the target into an image more suitable for human eyes to observe, or an image transmitted to an instrument for detection. As a scientific subject, the CV studies related theories and technologies, and attempts to establish an AI system that can obtain information from images or multi-dimensional data. The CV technologies generally include technologies such as image processing, image recognition, image semantic understanding, image retrieval, optical character recognition (OCR), video processing, video semantic understanding, video content/behavior recognition, three-dimensional object reconstruction, a 3D technology, virtual reality, augmented reality, synchronous positioning, and map construction, and further include biological feature recognition technologies such as common face recognition and fingerprint recognition.

With the research and progress of the AI technology, the AI technology is studied and applied to a plurality of fields, such as a common smart home, a smart wearable device, a virtual assistant, a smart speaker, smart marketing, unmanned driving, automatic driving, an unmanned aerial vehicle, a robot, smart medical care, and smart customer service. It is believed that with the development of technologies, the AI technology will be applied to more fields, and play an increasingly important role.

The solution provided in the embodiments of this application relates to technologies such as CV of AI, and a three-dimensional object segmentation method is provided. The method may be applied to a simulation-based physical simulation technology, which is widely applied to films and televisions, animations, games, robot control, and the like. An important component of physical simulation is how to segment a three-dimensional object, so as to facilitate later collision simulation.

The present disclosure describes various embodiments, at least providing technical solutions to address at least one of the problems/issues with the existing technology. The point cloud representing a three-dimensional object is scaled to the same scale in directions, and therefore, during subsequent segmentation processing, for example, hollowed-out structures of thin-walled objects are not recognized as approximatable or negligible depressions any more, so that, compared with a traditional three-dimensional object segmentation algorithm, segmentation accuracy is further improved.

Referring to FIG. 1, one embodiment includes a method for segmenting an three-dimensional object. The method may be performed by a device for segmenting the three-dimensional object. The three-dimensional object segmentation device may be any computer device that has computing and storage capabilities, for example, a terminal device such as a personal computer (PC), a mobile phone, or a tablet computer, or may be a server. As shown in FIG. 1, the three-dimensional object segmentation method includes all or a portion of the following steps.

Figure 2:
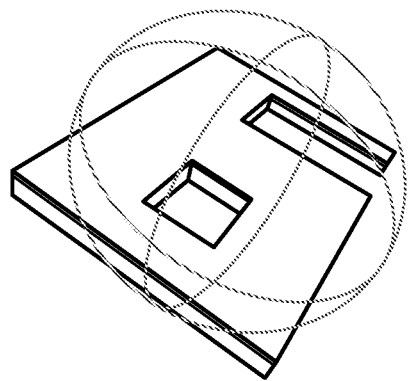
FIG. 2 is a schematic diagram of an example of a to-be-segmented three-dimensional object.

Referring to step S101, a point cloud of a three-dimensional object is obtained. For example, FIG. 2 shows an example of a to-be-segmented three-dimensional object. A point cloud may be a stored database (or data structure) including information of a set of points corresponding to one or more three-dimensional object. The point cloud may be pre-stored in a cloud storage or local storage relative to the three-dimensional object segmentation device. As shown in FIG. 2, the three-dimensional object is a wall surface that has a window and a door in an indoor scene. The point cloud may be generated by scanning the three-dimensional object by using a laser scanning component. In an actual scene, the generated point cloud generally has a quite high complexity. For example, the three-dimensional model (that is, the three-dimensional object described above) may be described using a triangular mesh. A complex triangular mesh model is often formed by hundreds of thousands or even billions of triangular patches. Considering requirements of a processing speed and a storage size, simplification is necessary. The simplified mesh mode requires reserving the shape of the model as much information as possible while merging vertices of the mesh. Therefore, in a possible implementation, simplified processing may be further performed on an originally obtained point cloud by means of merge points, delete points, and the like, so that the complexity of a subsequent algorithm is reduced, to accelerate a whole calculation process. For example, in the process of point cloud simplification, a quadric error metrics (QEM) simplification algorithm may be used. Because the QEM algorithm considers a simplification error of each point globally, the point cloud obtained through the QEM simplification may minimize a lose of accuracy while ensuring the simplification.

Figure 3:
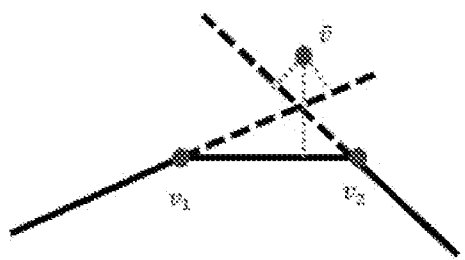
FIG. 3 is a schematic diagram used for describing a quadratic error metric (QEM) simplification algorithm.

For example, a specific process of simplifying the point cloud by using the QEM algorithm is as follows: Given a group of adjacent vertices $\{v_1, v_2, \ldots, v_k\}$, $\bar{v}$ needs to be determined to replace the vertices. Herein, $\bar{v}$ is determined by minimizing the QEM. If the square of a distance from a point V to a plane f is denoted by $d^2(v,f)$, $F(v_i)$ represents a set of mesh surfaces that use $v_i$ as the vertices, and a plane f is a plane in $F(v_i)$, the merged QEM is:

$$Q(\bar{v}) = \sum_{i=1}^{k} \sum_{f \in F(v_i)} d^2(\bar{v}, f).$$

k represents a quantity of vertices, k is a positive integer, and i is a positive integer less than or equal to k. $\bar{v}$ is determined by minimizing $Q(\bar{v})$. For example, during specific use, k=2 may be taken. It is assumed that there are three mesh surfaces whose vertices are vertices $v_1$, $v_2$. As shown in FIG. 3, dashed lines are distances from a merge point $\bar{v}$ to the three planes separately, and therefore, a sum of squares of lengths of the three dashed lines is the QEM of the merge point $\bar{v}$. Minimum QEMs are separately calculated for all adjacent two points, and the vertices are sequentially merged according to a sequence from small to large of the minimum QEMs, until a pre-specified vertex quantity is reached. In one implementation, the minimum QEMs of adjacent vertices may be sorted in an order from smaller value to larger value, and then the merging of adjacent vertices may follow the order from the smaller value to larger value, so that the adjacent vertices having the smallest minimum QEM may be merged first. The merging may continue until a total number of vertices drops below or equal to a pre-determined number of vertices.

As described above, the concavity of the object is sensitive to directions. If a size of a three-dimensional object in a specific dimension (for example, a thickness direction) greatly differs from sizes (for example, not of the same magnitude) in other two dimensions, a depression of the three-dimensional object in the dimension cannot be approximated. To avoid that the depression of the object in the dimension is approximated, in the three-dimensional object segmentation method according to the embodiments of this application, sizes of the point cloud representing the three-dimensional object in three dimensions in space are scaled to the same scale (for example, the same magnitude or the same size). For example, for a thin-walled object (that is, a three-dimensional object whose size in a specific direction is far less than sizes in other two directions), it is assumed that the thin-walled object is a three-dimensional object whose size in a height direction is far less than sizes in length and width directions. The scaling of the point cloud refers to upscaling the size of the thin-walled object in the height direction, and downscaling the size of the thin-walled object in the length and width directions. That is, the thin-walled object is deformed into an object whose sizes in three directions of length, width, and height are the same or approximately the same without changing a concave-convex structure of an outer surface of the thin-walled object.

Specifically, in step S102, three scaling directions of the point cloud are first determined. Because the object is in a three-dimensional space, scaling is performed on the point cloud of the object in three dimensions. That is, before the scaling of the point cloud is performed, the three scaling directions in which the scaling is performed needs to be first determined.

For example, three coordinate axes of a world coordinate system in which the point cloud obtained in step S101 is located may be used as the three scaling directions of the point cloud. However, the point cloud of the three-dimensional object may not be in the center of the world coordinate system, or may have a specific rotation angle. Therefore, in a more preferred implementation, it is intended to transform the coordinate system into a coordinate system that uses the center of the point cloud of the three-dimensional object as the origin, and the scaling directions of the point cloud in the coordinate system are further determined.

Figure 4:
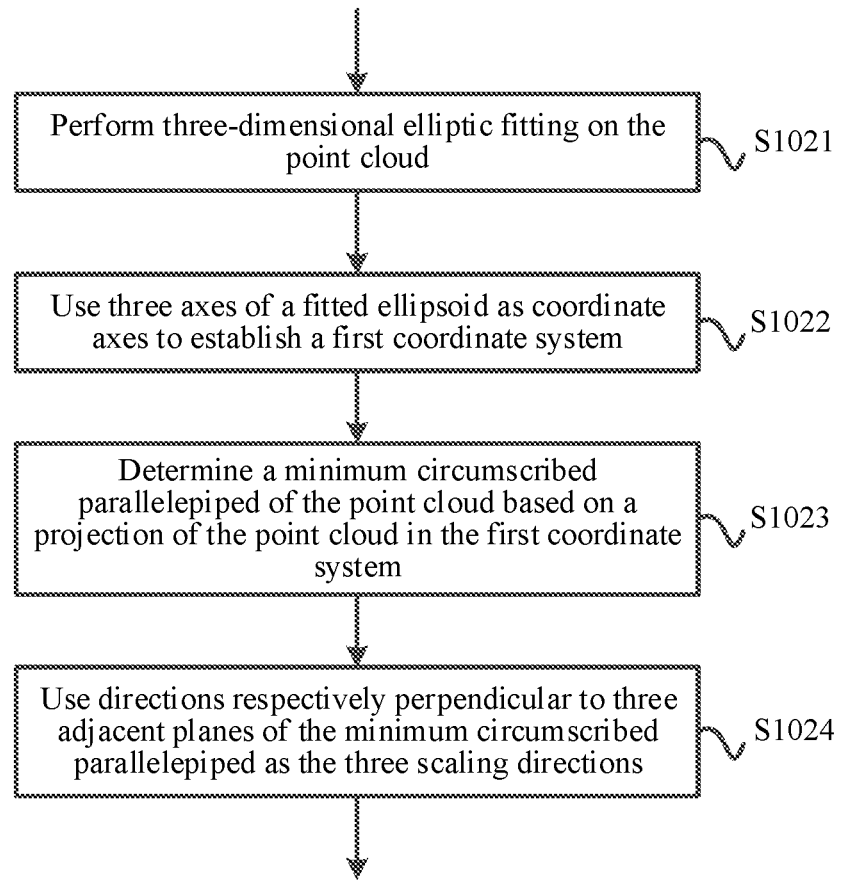
FIG. 4 is a flowchart of a possible processing process of the operation of determining scaling directions shown in FIG. 1.

Specifically, FIG. 4 shows a possible processing process of step S102. As shown in FIG. 4, the step of determining three scaling directions of the point cloud may further include all or a portion of the following steps.

Referring to step S1021, three-dimensional space ellipse fitting is performed on the point cloud. For example, spatial uniform distribution point sampling may be first performed on the point cloud (or, the point cloud is spatially uniformly sampled to obtain a set of sampled points which includes spatial uniform distribution points), and the three-dimensional elliptic fitting is then performed on the sampled points. The three-dimensional elliptic fitting means seeking for an ellipsoid in three-dimensional space, so that most of the sampled points can fall at or near a surface of the ellipsoid.

Specifically, point cloud data of the three-dimensional object has been obtained in step S101 described above. The point cloud data is a set of three-dimensional point coordinates in space, which is denoted by $$\{(x_i, y_i, z_i)\}_{i=1}^m.$$

m represents a quantity of three-dimensional points in space, $(x_i, y_i, z_i)$ represents coordinates of an $i^{th}$ three-dimensional point, m is a positive integer, and i is a positive integer less than or equal to m. These points may be substituted into the following ellipsoid equation:

$$Ax^2+By^2+Cz^2+Dxy+Exz+Fyz+Gx+Hy+Kz+L=0.$$

Figure 5:
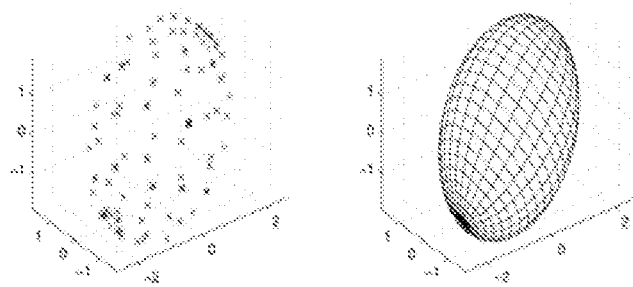
FIG. 5 shows schematic diagrams used for describing three-dimensional space ellipse fitting.

In addition, parameter requirements: $D^2<4AB$, $E^2<4AC$, and $F^2<4BC$ are met. First, initial solutions of these parameters are determined by using a least squares method. Then, final parameters are determined by using a Gauss-Newton iteration method. Once the parameters (that is, A, B, C, D, E, F, G, H, K, and L described above) in the ellipsoid equation are determined, the ellipsoid equation is determined. Therefore, a fitted ellipsoid can be determined. FIG. 5 shows an example of a point cloud of a three-dimensional object (510). As shown in the figure, a point set (510) may be fitted by using an ellipsoid (520).

Figure 6:
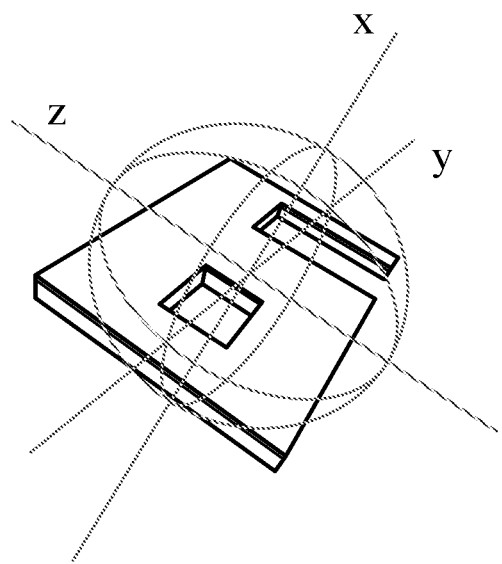
FIG. 6 is a schematic diagram of a first coordinate system obtained after three-dimensional space ellipse fitting.

Then, after the ellipsoid that can fit the point cloud is obtained, in step S1022, three axes (that is, directions of three radii) of a fitted ellipsoid are used as coordinate axes to establish a first coordinate system. FIG. 6 shows the three radial directions of the fitted ellipsoid obtained in step S1021, and the three radial directions are used as x, y, and z axes of the first coordinate system respectively. As shown in FIG. 6, the first coordinate system determined by three-dimensional elliptic fitting is a coordinate system that uses the center of the point cloud of the three-dimensional object as the origin of coordinates.

Referring to step S1023, a minimum circumscribed parallelepiped of the point cloud is determined based on a projection of the point cloud in the first coordinate system.

Figure 7:
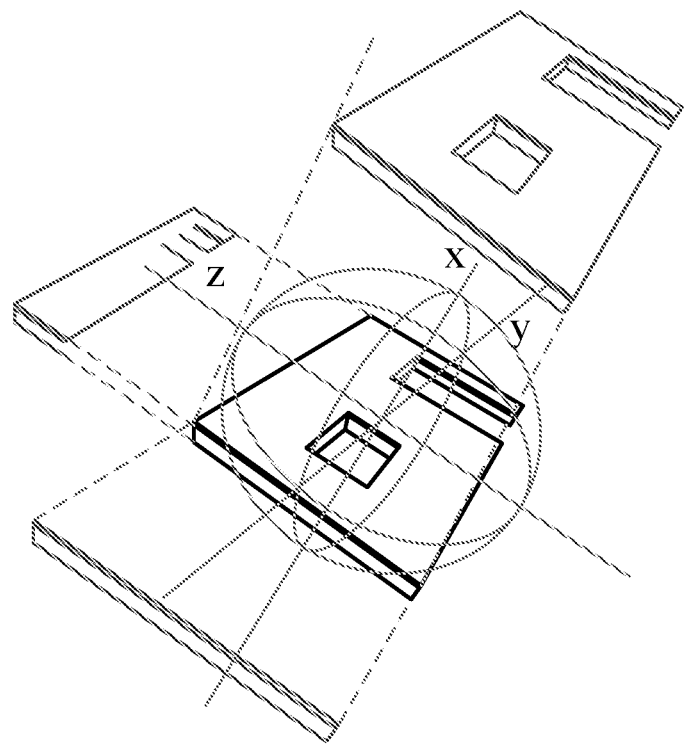
FIG. 7 is a schematic diagram of projections of a point cloud of a three-dimensional object along coordinate axes in a first coordinate system.

Specifically, first, a minimum circumscribed cuboid of the point cloud is obtained by performing rotation scale clamping on projections of the point cloud in coordinate axis planes. For example, in a possible implementation, first, for a projection of the point cloud in an xy coordinate plane, four planes perpendicular to the xy coordinate plane are used for rotation scale clamping, to select four planes that can include a minimum area of the projection of the point cloud in the xy coordinate plane, where the four planes includes two groups of parallel planes, and the two groups of parallel planes are orthogonal to each other. Then, for a projection of the point cloud in an xz coordinate plane or a yz coordinate plane, two parallel planes perpendicular to the xz coordinate plane or the yz coordinate plane are used for rotation scale clamping, to select two planes that can clamp a minimum size of the projection of the point cloud in the xz coordinate plane or the yz coordinate plane. In this way, the six planes determined by using the foregoing manner can form the minimum circumscribed cuboid of the point cloud. FIG. 7 shows projections of a point cloud of a three-dimensional object along coordinate axes in a first coordinate system. It can be learned from FIG. 7 that, because the three-dimensional object is a cuboid thin plate, a minimum circumscribed cuboid is the cuboid thin plate itself.

Optionally and/or alternatively, when the three-dimensional object is a thin-walled object of another shape, a possibility of further reducing the volume of the circumscribed cuboid exists. A volume of the circumscribed parallelepiped that can include all points in the point cloud may be further reduced by adjusting edges of the minimum circumscribed cuboid, for example, by tilting side edges of the minimum circumscribed cuboid and reducing a height of the minimum circumscribed cuboid, until the volume can no longer be reduced (or the volume may reach to its minimum). The parallelepiped obtained in this case is used as the minimum circumscribed parallelepiped of the point cloud. Herein, the volume of the minimum circumscribed parallelepiped is less than the volume of the minimum circumscribed cuboid.

Referring to step S1024, directions respectively perpendicular to three adjacent planes of the minimum circumscribed parallelepiped are used as the three scaling directions. The x, y, and z axes shown in FIG. 7 are the three scaling directions. As described above, when the three-dimensional object is a cuboid thin plate, the minimum circumscribed cuboid is the cuboid thin plate itself. Therefore, it can be learned from a comparison between FIG. 6 and FIG. 7 that, coordinate axes in FIG. 7 as the scaling directions are the same as coordinate axes in FIG. 6. However, when the three-dimensional object is a thin-walled object of another shape, the minimum circumscribed cuboid may be further adjusted to the minimum circumscribed parallelepiped, to adjust the volume to the minimum. In this case, the adjusted coordinate axes as the scaling directions are slightly different from the coordinate axes in FIG. 6.

Referring to FIG. 1 again, after the scaling directions of the point cloud are determined, next, in step S103, positions of points in the point cloud are separately scaled along the three scaling directions to obtain a scaled point cloud, so that the scaled point cloud has same scale in the three scaling directions. Herein, "same scale" means the same magnitude in term of size (for example, having a similar order in length, i.e., being several centimeters or several meters in size or length). In another implementation, "same scale" may include the same or approximately the same in term of size or length.

Figure 8:
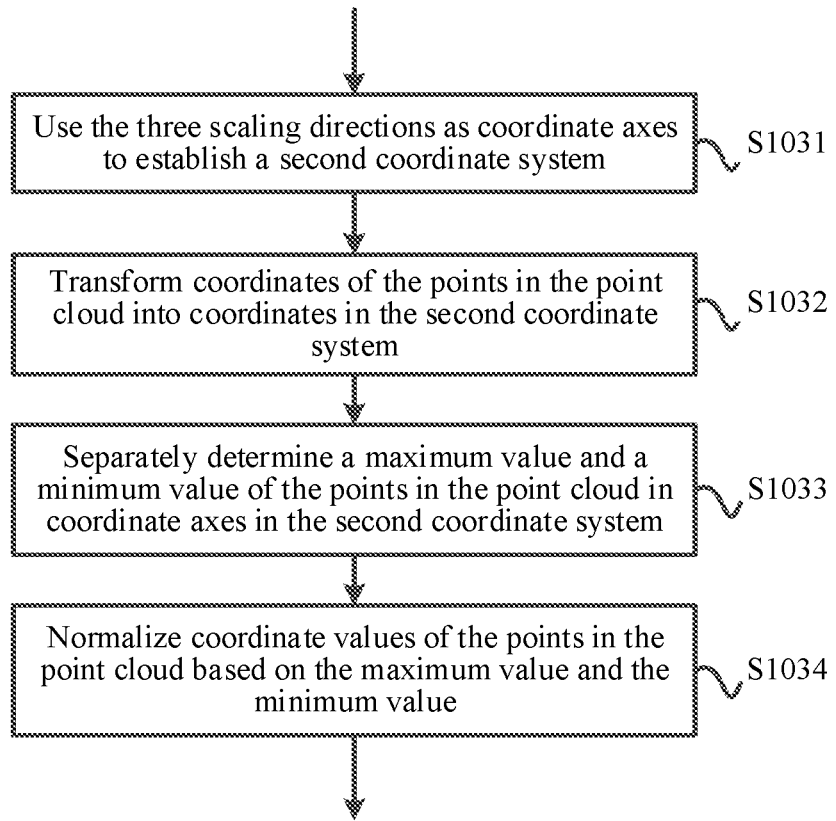
FIG. 8 is a flowchart of a specific process of the segmentation operation shown in FIG. 1.

Specifically, FIG. 8 shows a possible processing process of step S103. As shown in FIG. 8, the step of separately scaling positions of the point cloud along the three scaling directions may further include all or a portion of the following steps.

Referring to step S1031, the three scaling directions are used as coordinate axes to establish a second coordinate system. If the minimum circumscribed parallelepiped of the point cloud determined in step S1023 in FIG. 4 is a cuboid, the three scaling directions are perpendicular to each other. Otherwise, the three scaling directions are non-perpendicular. That is, three coordinate axes in the second coordinate system may be not perpendicular. However, this does not affect a surface concave-convex structure of the scaled point cloud, and as described in the context, after the segmentation is completed, the coordinate system is transformed back into the original world coordinate system.

Referring to step S1032, coordinates of the points in the point cloud are transformed into coordinates in the second coordinate system.

Referring to step S1033, a maximum value and a minimum value of the points in the point cloud in coordinate axes in the second coordinate system are separately determined.

Referring to step S1034, coordinate values of the points in the point cloud are normalized based on the maximum value and the minimum value. Therefore, the scaling of positions of the points in the point cloud is completed, so that all positions of the points are normalized to values between [−1, 1]. Here, [−1, 1] means between −1 and 1, inclusive.

Figure 9:
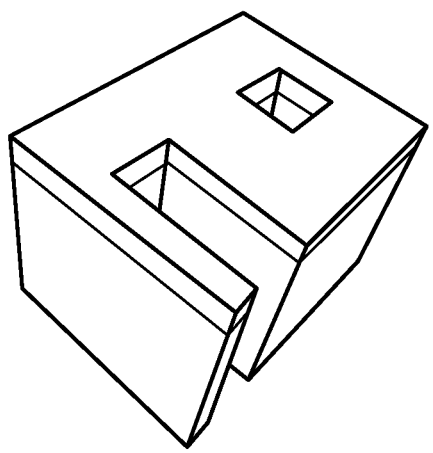
FIG. 9 is a schematic diagram of a three-dimensional object obtained after the scaling processing in FIG. 8.

FIG. 9 is a schematic diagram of a three-dimensional object obtained after the scaling processing in FIG. 8. As shown in FIG. 9, the original thin plate-type object is adjusted to an object that has the same scale in the three dimensions of the space.

Figure 10:
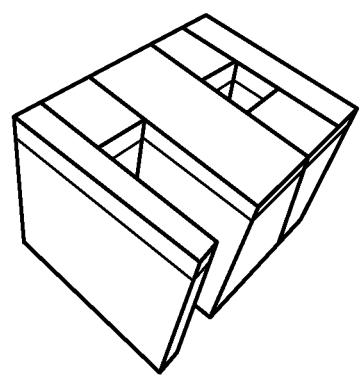
FIG. 10 is a schematic diagram of a three-dimensional object segmentation result obtained through segmentation processing in FIG. 1.

Referring to FIG. 1 again, finally, in step S104, as shown in FIG. 10, a segmentation result of the three-dimensional object is obtained by segmenting the three-dimensional object based on the scaled point cloud.

Figure 11:
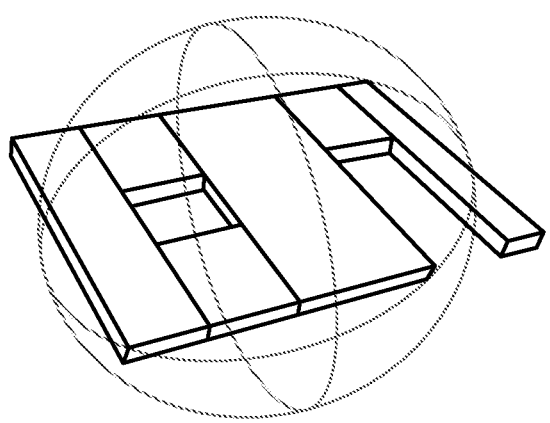
FIG. 11 is a schematic diagram of a final segmentation result obtained by inversely transforming a coordinate system of the segmentation result shown in FIG. 10 into an original coordinate system and scale.

Certainly, because the steps of the coordinate system transformation and scaling are performed before, for the segmentation result of the three-dimensional object obtained in step S104, the coordinate system needs to be inversely transformed back into the original coordinate system and scale, to obtain a final segmentation result, as shown in FIG. 11.

Figure 12:
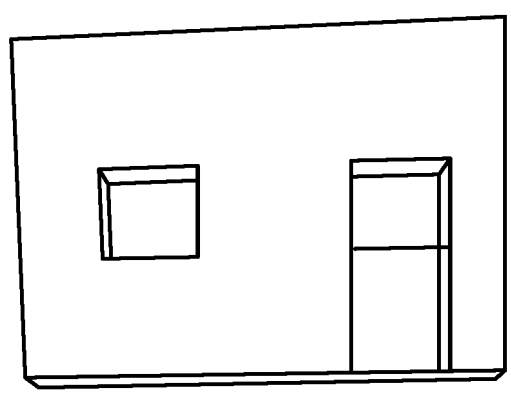
FIG. 12 is a schematic diagram of a comparison example of a segmentation result obtained by using a traditional approximate convex set segmentation algorithm.

In some embodiments of the present disclosure, the three-dimensional object segmentation method may include an approximate convex set segmentation algorithm. In the three-dimensional object segmentation method, the point cloud representing the three-dimensional object is scaled to the same scale in directions, and therefore, during subsequent segmentation processing, for example, hollowed-out structures of thin-walled objects are no longer recognized as approximatable depressions (or the hollowed-out structures of thin-walled objects are no longer recognized as negligible depressions). Compared with a traditional approximate convex set segmentation algorithm, the segmentation accuracy is further improved. FIG. 12 shows a comparison example of a segmentation result obtained by using a traditional approximate convex set segmentation algorithm. It can be clearly learned from FIG. 12 that, the traditional three-dimensional object segmentation algorithm recognizes a whole wall surface as a whole without any segmentation, but the three-dimensional object segmentation algorithm in this application can accurately perform convex set segmentation on the wall surface with the hollow-out structures.

Figure 13:
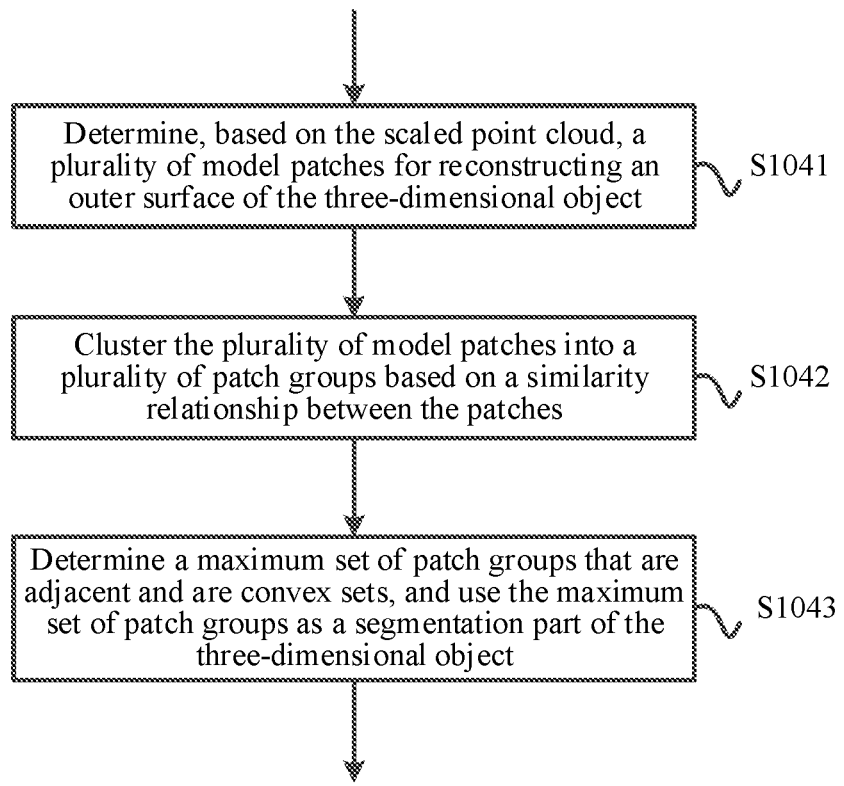
FIG. 13 is a flowchart of a specific process of segmentation processing in FIG. 1.

FIG. 13 shows a specific process of segmentation processing in FIG. 1. As shown in FIG. 13, the step of determining a segmentation result of the three-dimensional object may further include all or a portion of the following steps.

Referring to step S1041, a plurality of model patches for reconstructing an outer surface of the three-dimensional object are determined based on the scaled point cloud.

For example, in a possible implementation, the plurality of model patches for reconstructing the outer surface of the three-dimensional object may be performed by using the following manners:

First, the point cloud is cut by using a plurality of first cubes of equal size. For each first cube, whether the each first cube includes one or more points in the point cloud is determined. If the each first cube includes one or more points in the point cloud, the one or more points falling in the first cube are replaced with eight endpoints of the first cube. The same determining and processing are repeated until all first cubes are traversed. By such processing, an updated point cloud may be obtained. In the updated point cloud, all points are endpoints of the cube. Therefore, the points in the update point cloud are more evenly distributed.

Then, the updated point cloud is cut by using a plurality of second cubes of equal size, a volume of the second cube being greater than a volume of the first cube. For example, the second cube may include a plurality of first cubes.

Finally, corresponding model patches are determined based on a point intersection situation of the second cubes and the updated point cloud (or based on a point intersecting relationship between the second cubes and the updated point cloud). Specifically, for eight endpoints of each second cube, whether the eight endpoints are located in the updated point cloud is determined. Based on a quantity and positions of the endpoints located in the updated point cloud, a pre-established comparison table is looked up to determine which patches are used to reconstruct outer surface contours of the three-dimensional object.

Figure 14:
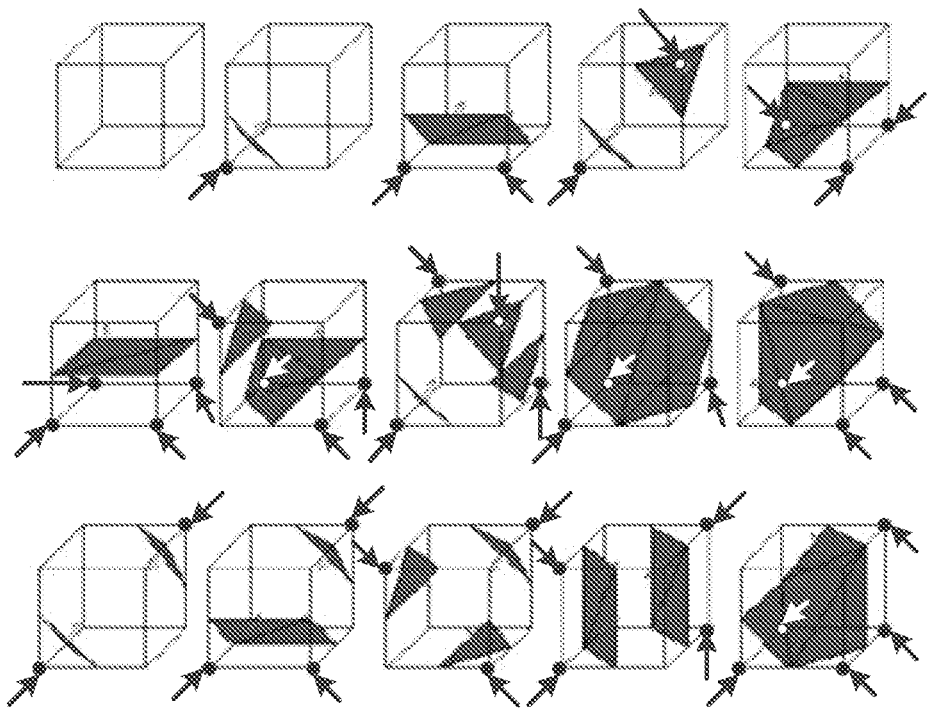
FIG. 14 is a comparison table for reconstructing outer surface contours of an object.

FIG. 14 is a comparison table of coincidence situations (or a point intersecting relationship) of the eight endpoints of the second cube and the points in the updated point cloud and corresponding model patches. In FIG. 14, solid points indicated by arrows represent endpoints on the second cube that coincide with the points in the updated point cloud, and a plurality of patches filled with dark colors inside the second cube represent corresponding model patches.

A situation of the second row in the first column in FIG. 14 is used as an example for description. If four endpoints on a lower surface in the second cube coincide with the points in the updated point cloud, the four endpoints are replaced with a patch shown in the cube. That is, for a current focal second cube, a coincidence situation of endpoints and the points in the updated point cloud, that is, which points in the second cube coincide with the points in the updated point cloud, is first determined, the points that coincide with the points in the updated point cloud then correspond to one of 15 cubes shown in FIG. 14, and the points are replaced with patches shown in the cube.

The same processing are repeated for each second cube until all second cubes are traversed. After the processing is completed, the updated point cloud is changed to a combination of the plurality of model patches that can reconstruct the outer surface of the three-dimensional object. In addition, the obtained outer surface contours may be further searched for adjacent patches around, and normal vector mean adjustment is sequentially performed, to eliminate coarse particles on the outer surface of the object.

As shown in FIG. 14, triangular patches are used as model patches for reconstructing the object contour. Therefore, in the reconstructed object contour, more irregular graphic edges inevitably appear. That is, jagged boundaries and the like may appear when segmentation is performed. Therefore, in a possible implementation, after the contour surface is reconstructed, additional adjustment points may be further added, to enhance the regularity of subsequently segmented graphics.

Specifically, after the step of determining a plurality of model patches for reconstructing an outer surface of the three-dimensional object, the method according to this application may further include: adding adjustment points on each model patch; and generating a new model patch based on the added adjustment points.

For example, a mean value of vertices may be calculated sequentially for each triangular patch, and mean value points are inserted on the triangular patch. In addition, an intersection point of rays emitted by each mean value point as a starting point to the inside of the three-dimensional object in a normal vector direction perpendicular to the model patch and other model patches (for example, a model patch at the other end of the object) is used as a geometric symmetry point of the mean value point. Finally, new model patches are separately generated based on the mean value point and the geometric symmetry point. For example, the mean value point or the geometric symmetry point may be separately connected to the vertex of the triangular patch, to generate three new patches, and the newly generated triangular patches are added to the three-dimensional object.

Referring to step S1042, the plurality of model patches are clustered into a plurality of patch groups based on a similarity relationship between the patches. For example, for all patches reconstructed in step S1041, the similarity relationship may be determined by determining a concavity cost function between two adjacent patches. If the concavity cost function between the two adjacent patches is less than a threshold, the similarity between the two adjacent patches is regarded to be high, and the two adjacent patches are clustered into one patch group. Such processing is repeated for all the patches. Finally, all the model patches are clustered into a plurality of patch groups. In one implementation, when a concavity cost function between the two adjacent patches is less than a pre-determined threshold, the similarity between the two adjacent patches is regarded to be high. Thus, the two adjacent patches are grouped or merged into one patch group. Such grouping/merging may be repeated for all the patches, until all the patches are clustered into a plurality of patch groups.

Referring to step S1043, a maximum set of patch groups that are adjacent and are convex sets is determined, and the maximum set of patch groups is used as a segmentation part of the three-dimensional object. For example, the plurality of patch groups may be represented in a manner of a model patch connection graph, and a maximum spanning tree algorithm is applied to search the model patch connection graph for an independent subgraph. The independent subgraph represents the maximum set of patch groups that are adjacent and are convex sets. In addition, for the segmentation part generated in this way, local tiny depressions may further exist. Therefore, such local tiny depressions may be further filled. For example, a convex hull calculation may be performed by sequentially using incremental vertices for points in the obtained maximum set of the patch groups. The convex hull refers to a minimum convex polyhedron that can cover all points. Then, the generated convex hull is resampled and model contour adjustment is performed.

The foregoing processing is repeated for all the patch groups, until all segmentation parts of the three-dimensional object are found. At this point, the three-dimensional object segmentation is completed.

In addition, as described above, the transformation of the coordinate axes is performed during the scaling of the position of the point cloud, and therefore, after the segmentation result of the three-dimensional object is obtained, the reconstructed three-dimensional object needs to be further inversely transformed back into the original coordinate system and scale, to maintain the original shape of the three-dimensional object.

Specifically, based on the first coordinate system and the second coordinate system established in steps S1022 and S1031 and the normalization operation in step S1034 described above, a coordinate system rotation matrix and scale transform coefficients of the coordinate axes may be obtained. Then, a transformation relationship between an original world coordinate system and an original scale may be obtained by inversely transforming the coordinate system rotation matrix and the scale transformation coefficients. The coordinate transformation and scale transformation are sequentially performed on each patch in the set according to the obtained transformation relationship and the maximum set of patch groups that are adjacent and are convex sets obtained in step S1043, to remap back to initial positions. Finally, the segmentation result of the three-dimensional object may be obtained through sorting.

Figure 15:
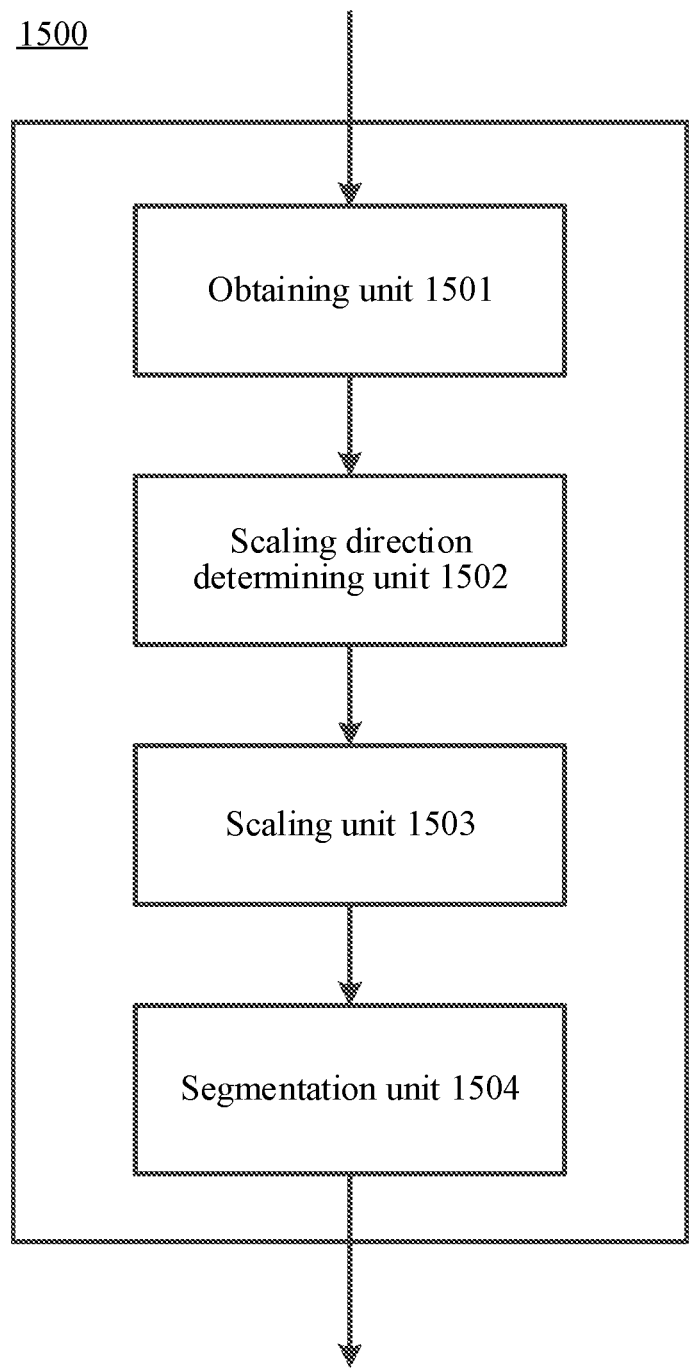
FIG. 15 is a functional block diagram of a specific configuration of a three-dimensional object segmentation device according to an embodiment of this application.

Next, the three-dimensional object segmentation device according to the embodiments of this application is described with reference to FIG. 15. As shown in FIG. 15, the three-dimensional object segmentation device 1500 includes: an obtaining unit 1501, a scaling direction determining unit 1502, a scaling unit 1503, and a segmentation unit 1504.

The obtaining unit 1501 is configured to obtain a point cloud of a three-dimensional object.

The scaling direction determining unit 1502 is configured to determine three scaling directions of the point cloud.

The scaling unit 1503 is configured to separately scale positions of points in the point cloud along the three scaling directions, so that the scaled point cloud has the same scale in the three scaling directions.

The segmentation unit 1504 is configured to determine a segmentation result of the three-dimensional object based on the scaled point cloud.

Because the object is in a three-dimensional space, scaling is performed on the point cloud of the object in three dimensions. That is, before the scaling of the point cloud is performed, the three scaling directions in which the scaling is performed needs to be first determined.

For example, three coordinate axes of a world coordinate system in which the point cloud obtained by the obtaining unit 1501 is located may be used as the three scaling directions of the point cloud. However, the point cloud of the three-dimensional object may not be in the center of the world coordinate system, or may have a specific rotation angle. Therefore, in a more preferred implementation, it is intended to transform the coordinate system into a coordinate system that uses the center of the point cloud of the three-dimensional object as the origin, and the scaling directions of the point cloud in the coordinate system are further determined.

Figure 16:
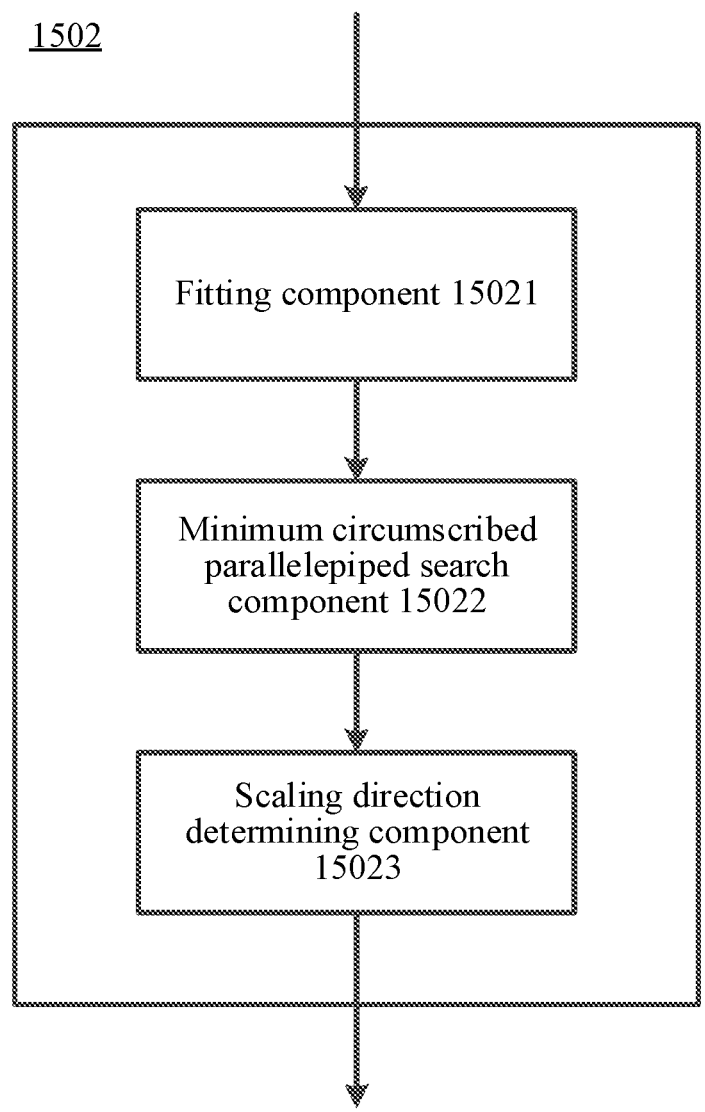
FIG. 16 shows an example of a specific configuration of the scaling direction determining unit in FIG. 15.

Specifically, FIG. 16 shows an example of a specific configuration of the scaling direction determining unit in FIG. 15. As shown in FIG. 16, the scaling direction determining unit 1502 may further include: a fitting component 15021, a minimum circumscribed parallelepiped search component 15022, and a scaling direction determining component 15023.

The fitting component 15021 is configured to: perform three-dimensional elliptic fitting on the point cloud, and use three axes of a fitted ellipsoid as coordinate axes to establish a first coordinate system.

The minimum circumscribed parallelepiped search component 15022 is configured to: determine a minimum circumscribed parallelepiped of the point cloud based on a projection of the point cloud in the first coordinate system.

Specifically, the minimum circumscribed parallelepiped search component 15022 is configured to: first, obtain a minimum circumscribed cuboid of the point cloud by performing rotation scale clamping on projections of the point cloud in coordinate axis planes. For example, in a possible implementation, first, for a projection of the point cloud in an xy coordinate plane, four planes perpendicular to the xy coordinate plane are used for rotation scale clamping, to select four planes that can include a minimum area of the projection of the point cloud in the xy coordinate plane, where the four planes include two groups of parallel planes, and the two group of parallel planes are orthogonal to each other. Then, for a projection of the point cloud in an xz coordinate plane or a yz coordinate plane, two parallel planes perpendicular to the xz coordinate plane or the yz coordinate plane are used for rotation scale clamping, to select two planes that can clamp a minimum size of the projection of the point cloud in the xz coordinate plane or the yz coordinate plane. In this way, the six planes determined by using the foregoing manner can form the minimum circumscribed cuboid of the point cloud. For example, when the three-dimensional object is a cuboid thin plate, the minimum circumscribed cuboid is the cuboid thin plate itself. However, when the three-dimensional object is a thin-walled object of another shape, a possibility of further reducing the volume of the circumscribed cuboid exists. A volume of the circumscribed parallelepiped that can include all points in the point cloud may be further reduced by adjusting edges of the minimum circumscribed cuboid, for example, by tilting side edges of the minimum circumscribed cuboid and reducing a height of the minimum circumscribed cuboid, until the volume can no longer be reduced. The parallelepiped obtained in this case is used as the minimum circumscribed parallelepiped of the point cloud. Herein, the volume of the minimum circumscribed parallelepiped is less than the volume of the minimum circumscribed cuboid.

The scaling direction determining component 15023 uses directions respectively perpendicular to three adjacent planes of the minimum circumscribed parallelepiped as the three scaling directions.

Specifically, in a possible implementation, the scaling unit 1503 may be further configured to: use the three scaling directions as coordinate axes as to establish a second coordinate system; transform coordinates of the points in the point cloud into coordinates in the second coordinate system; separately determine a maximum value and a minimum value of the points in the point cloud in coordinate axes in the second coordinate system; and normalize coordinate values of the points in the point cloud based on the maximum value and the minimum value.

It can be learned that, in the three-dimensional object segmentation device according to the embodiments of this application, the point cloud representing the three-dimensional object is scaled to the same scale in all directions, and therefore, during subsequent segmentation processing, for example, hollowed-out structures of thin-walled objects are no longer recognized as approximatable depressions, so that compared with a traditional three-dimensional object segmentation algorithm, the segmentation accuracy is further improved.

Figure 17:
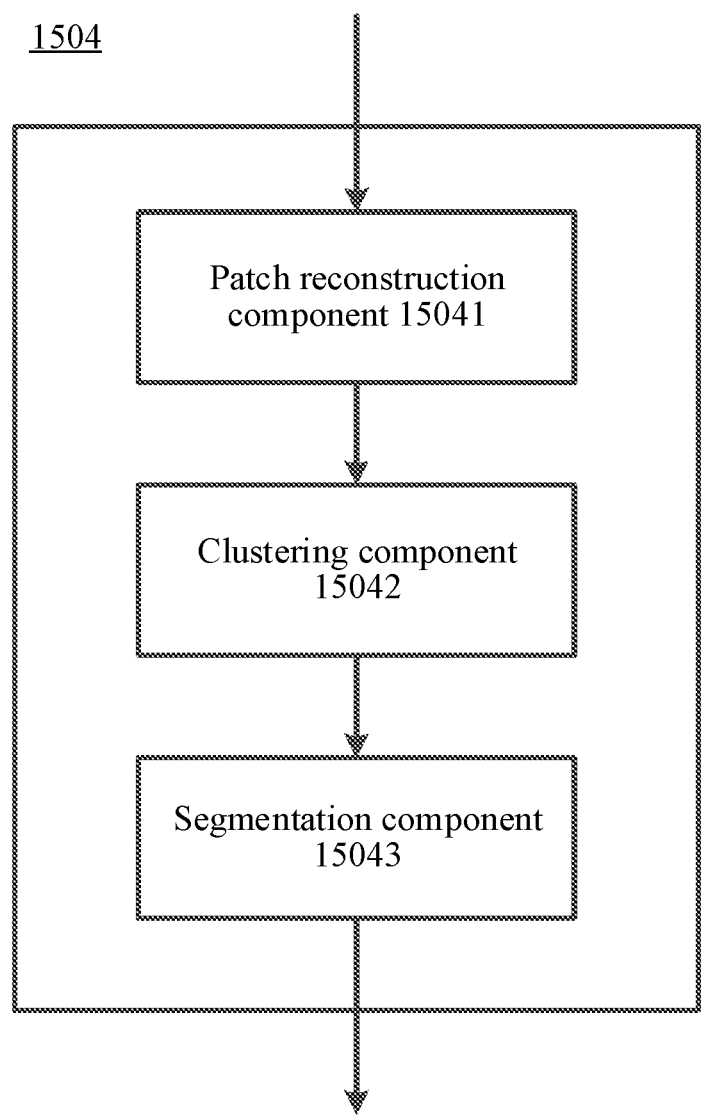
FIG. 17 shows an example of a specific configuration of the segmentation unit in FIG. 15.

In addition, FIG. 17 shows an example of a specific configuration of the segmentation unit in FIG. 15. As shown in FIG. 17, the segmentation unit 1504 further includes: a patch reconstruction component 15041, a clustering component 15042, and a segmentation component 15043.

The patch reconstruction component 15041 is configured to: determine, based on the scaled point cloud, a plurality of model patches for reconstructing an outer surface of the three-dimensional object. Specifically, the patch reconstruction component 15041 is further configured to: cut the point cloud by using a plurality of first cubes of equal size; replace all points in the point cloud with endpoints of the first cubes, and obtain an updated point cloud; cut the updated point cloud by using a plurality of second cubes of equal size, a volume of the second cube being greater than a volume of the first cube; and determine corresponding model patches based on a point intersection situation of the second cubes and the updated point cloud.

The clustering component 15042 is configured to: cluster the plurality of model patches into a plurality of patch groups based on a similarity relationship between the patches.

The segmentation component 15043 is configured to: determine a maximum set of patch groups that are adjacent and are convex sets, and use the maximum set of patch groups as a segmentation part of the three-dimensional object.

As described above, in the reconstructed object contour, more irregular graphic edges inevitably appear. That is, jagged boundaries and the like may appear when segmentation is performed. Therefore, in a possible implementation, after the contour surface is reconstructed, additional adjustment points may be further added, to enhance the regularity of subsequently segmented graphics.

Specifically, the segmentation unit 1504 may further include: an adjustment component (not shown in the figure)

is configured to: add adjustment points on each model patch; and generate a new model patch based on the added adjustment points.

In addition, as described above, the transformation of the coordinate axes is performed during the scaling of the position of the point cloud, and therefore, the three-dimensional object segmentation device 1500 may further include: an inverse transformation unit (not shown in the figure), configured to inversely transform the reconstructed three-dimensional object back into the original coordinate system and scale after the segmentation result of the three-dimensional object is obtained, to maintain the original shape of the three-dimensional object.

Because specific operations of the units or the components in the three-dimensional object segmentation device according to the embodiments of this application completely correspond to the process steps in the three-dimensional object segmentation method described above, to avoid redundancy, details of the specific operations are not described herein.

Figure 18:
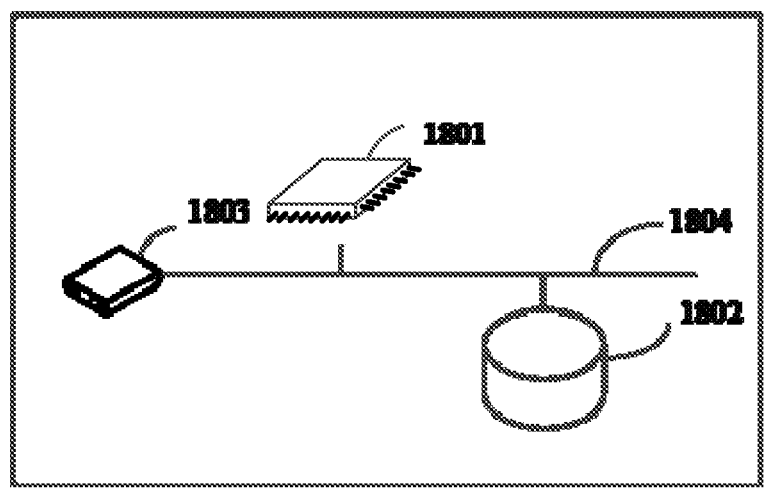
FIG. 18 shows an example of using a three-dimensional object segmentation device as a hardware entity according to this application.

FIG. 18 shows an example of using a three-dimensional object segmentation device as a hardware entity according to this application. The device includes a processor (also referred to as a processing unit) 1801, a memory (also referred to as a storage unit) 1802, and at least one external communication interface 1803. The processor 1801, the memory 1802, and the external communication interface 1803 are all connected by using a communication bus 1804.

For the processor 1801 configured for data processing, the data processing may be implemented by using a microprocessor, a central processing unit (CPU), a digital signal processor (DSP), or a field-programmable gate array (FPGA). For the memory 1802, operation instructions are included. The operation instructions may be computer executable code (also referred to as a computer program). The steps in the procedure of the method according to the embodiments of this application are implemented by using the operation instructions.

Figure 19:
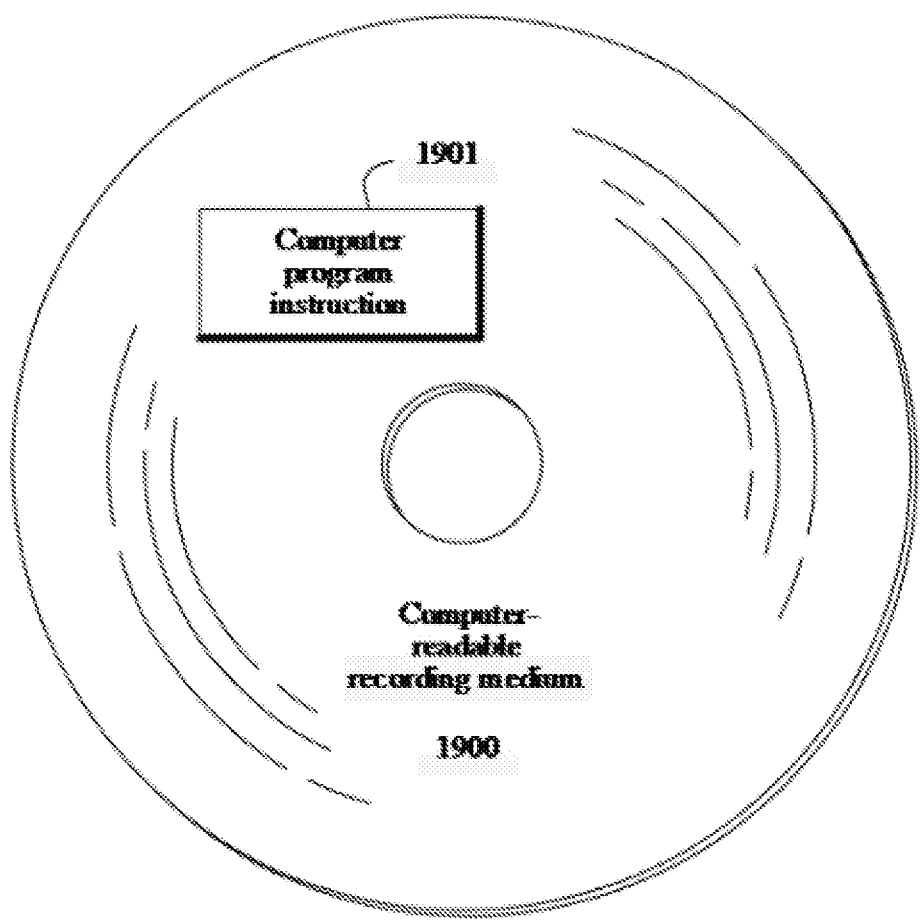
FIG. 19 is a schematic diagram of a computer-readable recording medium according to an embodiment of this application.

FIG. 19 is a schematic diagram of a computer-readable recording medium according to an embodiment of this application. As shown in FIG. 19, the computer-readable recording medium 1900 according to this embodiment of this application stores computer program instructions 1901. The computer program instructions 1901, when executed by a processor, perform the three-dimensional object segmentation method according to the embodiments of this application described with reference to the foregoing accompanying drawings.

So far, the three-dimensional object segmentation method and device, and the medium according to the embodiments of this application have been described in detail with referring to FIG. 1 to FIG. 19. In the three-dimensional object segmentation method and device, and the medium according to the embodiments of this application, the point cloud representing the three-dimensional object is scaled to the same scale in directions, and therefore, during subsequent segmentation processing, for example, hollowed-out structures of thin-walled objects are no longer recognized as approximatable depressions, so that compared with a traditional three-dimensional object segmentation algorithm, the segmentation accuracy is further improved.

In this specification, the term "include", "comprise", or any other variant is intended to cover non-exclusive include, so that a process, a method, an article, or a device that includes a series of elements and that not only includes such elements, but also includes other elements not explicitly listed, or may further include elements inherent in the process, the method, the article, or the device. Unless otherwise specified, an element limited by "include . . . " does not exclude other same elements existing in the process, the method, the article, or the device that includes the element.

Finally, the foregoing series of processing not only include processing performed in the order described herein according to a time sequence, but also include processing performed in parallel or separately, rather than according to the time sequence.

Based on the foregoing description of the implementations, a person skilled in the art may clearly understand that this application may be implemented by using software in addition to a necessary hardware platform, or certainly, may be implemented by using software or hardware only. Based on such an understanding, all or the part of the technical solutions of this application contributing to the technology in the background part may be implemented in the form of a software product. The computer software product may be stored in a storage medium, such as a ROM/RAM, a magnetic disk, or an optical disc, and includes several instructions for instructing a computer device (which may be a personal computer, a server, or a network device) to perform the method described in the embodiments or some parts of the embodiments of this application.

This application is described above in detail. Although the principles and implementations of this application are described by using specific examples in this specification, the descriptions of the foregoing embodiments are merely intended to help understand the method and the core idea of the method of this application. Meanwhile, a person of ordinary skill in the art may make modifications to the specific implementations and application range according to the idea of this application. In conclusion, the content of this specification is not construed as a limit on this application.

What is claimed is:

1. A method for segmenting a three-dimensional object, the method comprising:
   obtaining, by a device comprising a memory storing instructions and a processor in communication with the memory, a point cloud of a three-dimensional object;
   determining, by the device, three scaling directions of the point cloud by:
      performing, by the device, three-dimensional elliptic fitting on the point cloud,
      using, by the device, three axes of a fitted ellipsoid as coordinate axes to establish a first coordinate system,
      determining, by the device, a minimum circumscribed parallelepiped of the point cloud based on a projection of the point cloud in the first coordinate system by:
         obtaining, by the device, a minimum circumscribed cuboid of the point cloud by performing rotation scale clamping on projections of the point cloud in coordinate axis planes, and
         obtaining, by the device, the minimum circumscribed parallelepiped by adjusting edges of the minimum circumscribed cuboid, a volume of the minimum circumscribed parallelepiped being less than a volume of the minimum circumscribed cuboid, and
      using, by the device, directions respectively perpendicular to three adjacent planes of the minimum circumscribed parallelepiped as the three scaling directions;
   scaling, by the device, positions of points in the point cloud along the three scaling directions to obtain a scaled point cloud, so that the scaled point cloud has the same magnitude in term of size in the three scaling directions; and segmenting, by the device, the three-dimensional object based on the scaled point cloud to obtain a segmentation result.

2. The method according to claim 1, wherein the scaling the positions of the point cloud along the three scaling directions to obtain the scaled point cloud comprises:

using, by the device, the three scaling directions as coordinate axes to establish a second coordinate system;

transforming, by the device, coordinates of the points in the point cloud into coordinates in the second coordinate system;

separately determining, by the device, a maximum value and a minimum value of the points in the point cloud in the coordinate axes in the second coordinate system; and normalizing, by the device, coordinate values of the points in the point cloud based on the maximum value and the minimum value to obtain the scaled point cloud.

3. The method according to claim 1, wherein the segmenting the three-dimensional object based on the scaled point cloud to obtain the segmentation result comprises:

determining, by the device, based on the scaled point cloud, a plurality of model patches for reconstructing an outer surface of the three-dimensional object;

clustering, by the device, the plurality of model patches into a plurality of patch groups based on a similarity relationship between the model patches; and determining, by the device, a maximum set of patch groups that are adjacent and are convex sets, and using the maximum set of patch groups as a segmentation part of the three-dimensional object.

4. The method according to claim 3, wherein the determining, based on the scaled point cloud, the plurality of model patches for reconstructing the outer surface of the three-dimensional object comprises:

cutting, by the device, the point cloud by using a plurality of first cubes of equal size;

replacing, by the device, all points in the point cloud with endpoints of the first cubes, and obtaining an updated point cloud;

cutting, by the device, the updated point cloud by using a plurality of second cubes of equal size, a volume of a second cube in the second cubes being greater than a volume of a first cube in the first cubes; and determining, by the device, corresponding model patches based on a point intersecting relationship of the second cubes and the updated point cloud.

5. The method according to claim 3, wherein, after the determining the plurality of model patches for reconstructing the outer surface of the three-dimensional object, the method further comprises:

adding, by the device, adjustment points on each model patch; and generating, by the device, a new model patch based on the added adjustment points.

6. A device for segmenting a three-dimensional object, the device comprising:

a memory storing instructions; and a processor in communication with the memory, wherein, when the processor executes the instructions, the processor is configured to cause the device to:

obtain a point cloud of a three-dimensional object, determine three scaling directions of the point cloud by:

performing three-dimensional elliptic fitting on the point cloud, using three axes of a fitted ellipsoid as coordinate axes to establish a first coordinate system, determining a minimum circumscribed parallelepiped of the point cloud based on a projection of the point cloud in the first coordinate system by:

obtaining a minimum circumscribed cuboid of the point cloud by performing rotation scale clamping on projections of the point cloud in coordinate axis planes, and obtaining the minimum circumscribed parallelepiped by adjusting edges of the minimum circumscribed cuboid, a volume of the minimum circumscribed parallelepiped being less than a volume of the minimum circumscribed cuboid, and using directions respectively perpendicular to three adjacent planes of the minimum circumscribed parallelepiped as the three scaling directions, scale positions of points in the point cloud along the three scaling directions to obtain a scaled point cloud, so that the scaled point cloud has the same magnitude in term of size in the three scaling directions, and segment the three-dimensional object based on the scaled point cloud to obtain a segmentation result.

7. The device according to claim 6, wherein, when the processor is configured to cause the device to scale the positions of the point cloud along the three scaling directions to obtain the scaled point cloud, the processor is configured to cause the device to:

use the three scaling directions as coordinate axes to establish a second coordinate system;

transform coordinates of the points in the point cloud into coordinates in the second coordinate system;

separately determine a maximum value and a minimum value of the points in the point cloud in the coordinate axes in the second coordinate system; and normalize coordinate values of the points in the point cloud based on the maximum value and the minimum value to obtain the scaled point cloud.

8. The device according to claim 6, wherein, when the processor is configured to cause the device to segment the three-dimensional object based on the scaled point cloud to obtain the segmentation result, the processor is configured to cause the device to:

determine, based on the scaled point cloud, a plurality of model patches for reconstructing an outer surface of the three-dimensional object;

cluster the plurality of model patches into a plurality of patch groups based on a similarity relationship between the model patches; and determine a maximum set of patch groups that are adjacent and are convex sets, and use the maximum set of patch groups as a segmentation part of the three-dimensional object.

9. The device according to claim 8, wherein, when the processor is configured to cause the device to determine, based on the scaled point cloud, the plurality of model patches for reconstructing the outer surface of the three-dimensional object, the processor is configured to cause the device to:

cut the point cloud by using a plurality of first cubes of equal size;

replace all points in the point cloud with endpoints of the first cubes, and obtain an updated point cloud;

cut the updated point cloud by using a plurality of second cubes of equal size, a volume of a second cube in the second cubes being greater than a volume of a first cube in the first cubes; and determine corresponding model patches based on a point intersecting relationship of the second cubes and the updated point cloud.

10. The device according to claim 8, wherein, after the processor is configured to cause the device to determine the plurality of model patches for reconstructing the outer surface of the three-dimensional object, the processor is configured to cause the device to:

add adjustment points on each model patch; and generate a new model patch based on the added adjustment points.

11. A non-transitory computer readable storage medium storing computer readable instructions, wherein, the computer readable instructions, when executed by a processor, are configured to cause the processor to perform:

obtaining a point cloud of a three-dimensional object;

determining three scaling directions of the point cloud by:
performing three-dimensional elliptic fitting on the point cloud,
using three axes of a fitted ellipsoid as coordinate axes to establish a first coordinate system,
determining a minimum circumscribed parallelepiped of the point cloud based on a projection of the point cloud in the first coordinate system by:
obtaining a minimum circumscribed cuboid of the point cloud by performing rotation scale clamping on projections of the point cloud in coordinate axis planes, and
obtaining the minimum circumscribed parallelepiped by adjusting edges of the minimum circumscribed cuboid, a volume of the minimum circumscribed parallelepiped being less than a volume of the minimum circumscribed cuboid, and
using directions respectively perpendicular to three adjacent planes of the minimum circumscribed parallelepiped as the three scaling directions;

scaling positions of points in the point cloud along the three scaling directions to obtain a scaled point cloud, so that the scaled point cloud has the same magnitude in term of size in the three scaling directions; and segmenting the three-dimensional object based on the scaled point cloud to obtain a segmentation result.

12. The non-transitory computer readable storage medium according to claim 11, wherein, when the computer readable instructions are configured to cause the processor to perform scaling the positions of the point cloud along the three scaling directions to obtain the scaled point cloud, the computer readable instructions are configured to cause the processor to perform:

using the three scaling directions as coordinate axes to establish a second coordinate system;

transforming coordinates of the points in the point cloud into coordinates in the second coordinate system;

separately determining a maximum value and a minimum value of the points in the point cloud in the coordinate axes in the second coordinate system; and normalizing coordinate values of the points in the point cloud based on the maximum value and the minimum value to obtain the scaled point cloud.

13. The non-transitory computer readable storage medium according to claim 11, wherein, when the computer readable instructions are configured to cause the processor to perform segmenting the three-dimensional object based on the scaled point cloud to obtain the segmentation result, the computer readable instructions are configured to cause the processor to perform:

determining, based on the scaled point cloud, a plurality of model patches for reconstructing an outer surface of the three-dimensional object;

clustering the plurality of model patches into a plurality of patch groups based on a similarity relationship between the model patches; and determining a maximum set of patch groups that are adjacent and are convex sets, and using the maximum set of patch groups as a segmentation part of the three-dimensional object.

14. The non-transitory computer readable storage medium according to claim 13, wherein, when the computer readable instructions are configured to cause the processor to perform determining, based on the scaled point cloud, the plurality of model patches for reconstructing the outer surface of the three-dimensional object, the computer readable instructions are configured to cause the processor to perform:

cutting the point cloud by using a plurality of first cubes of equal size;

replacing all points in the point cloud with endpoints of the first cubes, and obtaining an updated point cloud;

cutting the updated point cloud by using a plurality of second cubes of equal size, a volume of a second cube in the second cubes being greater than a volume of a first cube in the first cubes; and determining corresponding model patches based on a point intersecting relationship of the second cubes and the updated point cloud.

* * * * *